US007263104B2

(12) United States Patent
Chiba (10) Patent No.: US 7,263,104 B2
(45) Date of Patent: Aug. 28, 2007

(54) CONCENTRATOR AND RESET CONTROL METHOD THEREFOR

(75) Inventor: Hideaki Chiba, Tokyo (JP)

(73) Assignee: Allied Telesis Kabushiki Kaisha, Tokyo (JP)

( * ) Notice: Subject to any disclaimer, the term of this patent is extended or adjusted under 35 U.S.C. 154(b) by 962 days.

(21) Appl. No.: 10/343,410

(22) PCT Filed: May 17, 2002

(86) PCT No.: PCT/JP02/04833

§ 371 (c)(1),
(2), (4) Date: Feb. 10, 2003

(87) PCT Pub. No.: WO03/098874

PCT Pub. Date: Nov. 27, 2003

(65) Prior Publication Data

US 2003/0224827 A1    Dec. 4, 2003

(51) Int. Cl.
*H04J 3/17*    (2006.01)
(52) U.S. Cl. .................................... 370/434
(58) Field of Classification Search ............... 370/434, 370/104, 254, 252, 389, 435, 432, 436, 230, 370/241, 255, 256, 257, 258
See application file for complete search history.

(56) References Cited

U.S. PATENT DOCUMENTS 4,355,207 A * 10/1982  Curtin ..................... 379/88.19
5,222,062 A *  6/1993  Sharma et al. ............... 370/218
5,226,120 A *  7/1993  Brown et al. ................ 709/224
5,280,586 A *  1/1994  Kunz et al. ..................... 710/2
6,132,832 A * 10/2000  Crichton et al. .............. 428/49

FOREIGN PATENT DOCUMENTS

| JP | 59091754 A | * | 8/1984 |
| JP | 2000-196651 A |  | 7/2000 |
| JP | 2000-307600 |  | 11/2000 |

OTHER PUBLICATIONS

Office Action ("Notice of Reasons for Rejection") in JP Patent Application No. 2004-506244 (Mar. 14, 2006).

* cited by examiner

*Primary Examiner*—Hassan Kizou
*Assistant Examiner*—Mounir Moutaouakil
(74) *Attorney, Agent, or Firm*—Stroock & Stroock & Lavan (57) ABSTRACT

There is provided a concentrator and a reset control method therefor that may easily and reliably secure early restoration from an outage of network communications. A concentrator to which a plurality of network devices are connectible includes a communication control part for controlling a transfer process of information among the network devices, a condition determination part for determining whether information obtained from the communication control part satisfies a reset condition, and a reset control part for controlling a reset signal used to reset the communication control part based on a determination by the condition determination part.

18 Claims, 7 Drawing Sheets

CONCENTRATOR AND RESET CONTROL METHOD THEREFOR

BACKGROUND OF THE INVENTION

1. Field of the Invention

The present invention relates generally to network devices and communication control methods, and more particularly to restoration of a concentrator and a network. In the present application, a concentrator conceptually covers a repeater hub and a switching hub. The repeater hub is a basic hub used for 10BASE-T and 100BASE-TX. The switching hub is one of the concentrators used as an Ethernet terminal having a switching function: It serves to read a Media Access Control ("MAC") address of a destination terminal and sends a packet to a port connected to the terminal.

2. Description of Related Art

Along with recent widespread LANs and WANs, a large number of network devices, such as personal computers ("PCs" hereinafter) and concentrators have been connected to a network like the Ethernet for frequent information sharing and communications.

The concentrator has many functions, including a repeater function and a link test function. The repeater function is one which repetitively relays a transmission signal. The link test function is one which prevents malfunctions in a hub due to noises at the time of disconnection or release of an Unshielded Twisted Pair Cable ("UTP") that connects devices that mutually send a link test pulse.

When a concentrator has an error or a "bug", the concentrator cannot provide the above functions, resulting in an outage of network communications in a wide area. In such a case, the network is required to be restored before the cause is investigated. An exchange or replacement of the concentrator would restore the network, but the exchange is uneconomical and a reset of the concentrator would often lead to restoration of the network without the replacement according to experience. Therefore, a network administrator usually resets the concentrator by manual operations.

The manual operation has been used due to a fact that the breakdown frequency of the concentrator is not very high. Since a network administrator often serves another job in some companies, he delays resetting the concentrator, and disadvantageously causes outage of network communications for a long time. On the other hand, when the concentrator is reset for every defect, the number of resets becomes so large, hindering the smooth network communications instead.

Accordingly, it is an exemplary object of the present invention to provide a novel and useful concentrator and a reset control method therefor, in which the above disadvantages are eliminated.

Another exemplary and more specific object of the present invention is to provide a concentrator and a reset control method therefor that may easily and reliably secure early restoration from an outage of network communications.

SUMMARY OF THE INVENTION

In order to achieve the above objects, a concentrator of one embodiment of the present invention to which a plurality of network devices are connectible includes a communication control part or component for controlling a transfer process of information among the network devices, a condition determination part for determining whether information obtained from the communication control part satisfies a reset condition, and a reset control part for controlling a reset signal used to reset the communication control part based on a determination by the condition determination part. This concentrator limits the reset condition to necessary cases through the condition determination part, and the reset control part automatically resets the communication control part.

The reset control part may selectively reset part of a circuit in the communication control part, thereby resetting part in the concentrator relating to the network device that is broken or likely to be broken while maintaining communications of other network devices. Alternatively, the reset control part may reset the communication control part entirely. This is effective where partial resetting would cause new obstructions or errors.

The reset condition may include time information, and the concentrator may include a timer for measuring the time information. Thereby, the reset control part may start a reset control when it is predetermined time or when a predetermined period passes.

The condition determination part may be connected to the communication control part and may include a hardware status monitoring part for detecting a status of hardware including the communication control part and the network devices. The condition determination part may be connected to the communication control part and may include a software status monitoring part for detecting a status of software of the communication control part.

Preferably, the reset condition is set variably. Thereby, the concentrator may be flexible in responding to various events that cause the concentrator to be reset. Preferably, the concentrator further includes a controller for controlling each component in the concentrator, and a non-volatile memory for storing a status of the controller before the communication control part is reset. Thereby, the concentrator may restore the previous status after the resetting. Preferably, the concentrator further includes a non-volatile memory for storing a status of the reset condition. Thereby, the concentrator may reset all or part of the communication control part.

A method of another embodiment of the present invention for controlling resetting a concentrator to which a plurality of network device are connectible includes the steps of determining whether at least one of a communication control part and a timer has generated a signal that satisfies a predetermined reset condition, the communication control part controlling a transfer process of information among the network devices, and generating a signal for resetting the communication control part when the determining step determines the reset condition has been satisfied. This method also exhibits operations similar to the above concentrator.

The generating step may generate a signal for selectively resetting part of a circuit in the communication control part, thereby resetting the part in the concentrator relating to the network device that is broken or likely to be broken while maintaining communications of other network devices.

The reset condition may include an occurrence of one event, or simultaneous or time-sequential occurrences of multiple events. In addition, the reset condition may include a lack of a predetermined action longer than a prescribed period or a continuation of an erroneous event longer than the prescribed period.

For example, the reset condition in one embodiment is an occurrence of a collision between the network devices or a change of a "link on" state, indicative of a communication availability between the concentrator and the network device, into an "off" state. The reset condition in another embodiment is a start of a "communication active" state indicative of a reception of a packet through one port connected to the network device, and a lack of updating of the number of packets received at the port within a certain period. The reset condition in still another embodiment is a start of a communication active state, indicative of a transmission of a packet through one port connected to the network device, and a lack of updating of the number of packets transmitted by the port within a certain period. The reset condition in another embodiment includes a start of a communication active state indicative of a transmission of a packet through one port connected to the network device, an update of a number of packets received at the port within a certain period, and a lack of updating of the number of packets transmitted by the port within a certain period.

The reset condition in still another embodiment includes a transmission of a pause packet signal for a certain period to request one port connected to the network device to stop sending the packet. The reset condition may include an update of a number of packets within a certain period that one port connected to the network device has received, and a lack of release or allocation of a buffer for temporarily storing the packet within a certain period.

A concentrator of another embodiment of the present invention for use with a local area network has a plurality of ports, serves to monitor a communication status, and includes specific reset activating means for activating a specific reset function different from a reset at the time of power-on and for previously determining whether the specific reset function activates when the specific trigger condition is met, means for designating and varying one or more various specific trigger conditions, and a non-volatile memory for storing a designated status of a controller when the specific reset function activates, wherein the non-volatile memory maintains memory contents during an action of the specific reset function and the power-on time reset, providing the concentrator with an automatic restoration function at the time of obstructions or errors. This concentrator automatically restores functioning when the specific trigger condition is met.

Preferably, the specific trigger condition is programmable so that the specific trigger condition may designate an occurrence of one event or simultaneous occurrences of multiple events at the same time, or an occurrence of one event at each of multiple times or a simultaneous occurrences of multiple events at each of multiple times, respective time-sequentially occurring event or events being able to be designated as the same or different event or events at such times, and a condition between each time-sequential event or group of events being able to be designated. Thereby, the concentrator may be flexible in responding to various events that cause the concentrator to be reset.

The specific trigger function may designate the simultaneously reset of all communication functions in the concentrator or the reset of part of a communication control function in the concentrator, these operations being conducted in accordance with setting of the specific trigger conditions. The specific trigger condition may reset a communication control function relating to one or more communication ports for which the specific trigger condition occurs, thereby resetting the part in the concentrator relating to the network device that is broken or likely to be broken while maintaining communications of other network devices. Alternatively, the reset control part may reset the communication control part entirely, where partial resetting would cause new obstructions or errors.

In one embodiment, setting of the specific trigger condition may reset a reception port or transmission port or simultaneously reset all the communication functions in the concentrator when the port does not perform a receiving action or a transmitting action longer than a designated prescribed time, as determined by the communication status being monitored. In another embodiment, the specific trigger condition designates control error types and a continuous occurrence of the control error for a designated period beyond a prescribed time, the specific control function being activated when the control error occurs over the designated period.

Other objects and further features of the present invention will become readily apparent from the following description of the embodiments with reference to accompanying drawings.

DETAILED DESCRIPTION OF PREFERRED EMBODIMENTS

Figure 1:
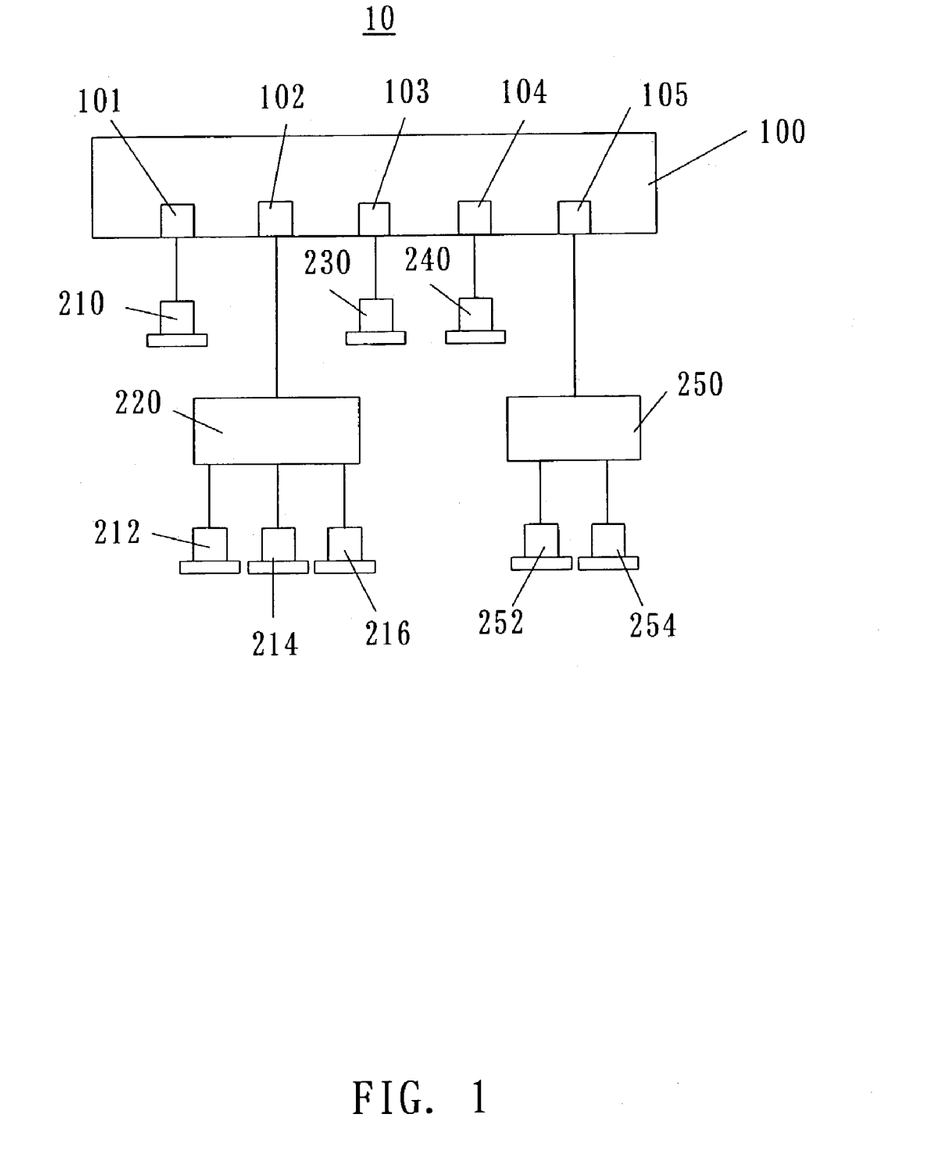
FIG. 1 is a view of an exemplary network configuration of one embodiment according to the present invention.
Figure 2:
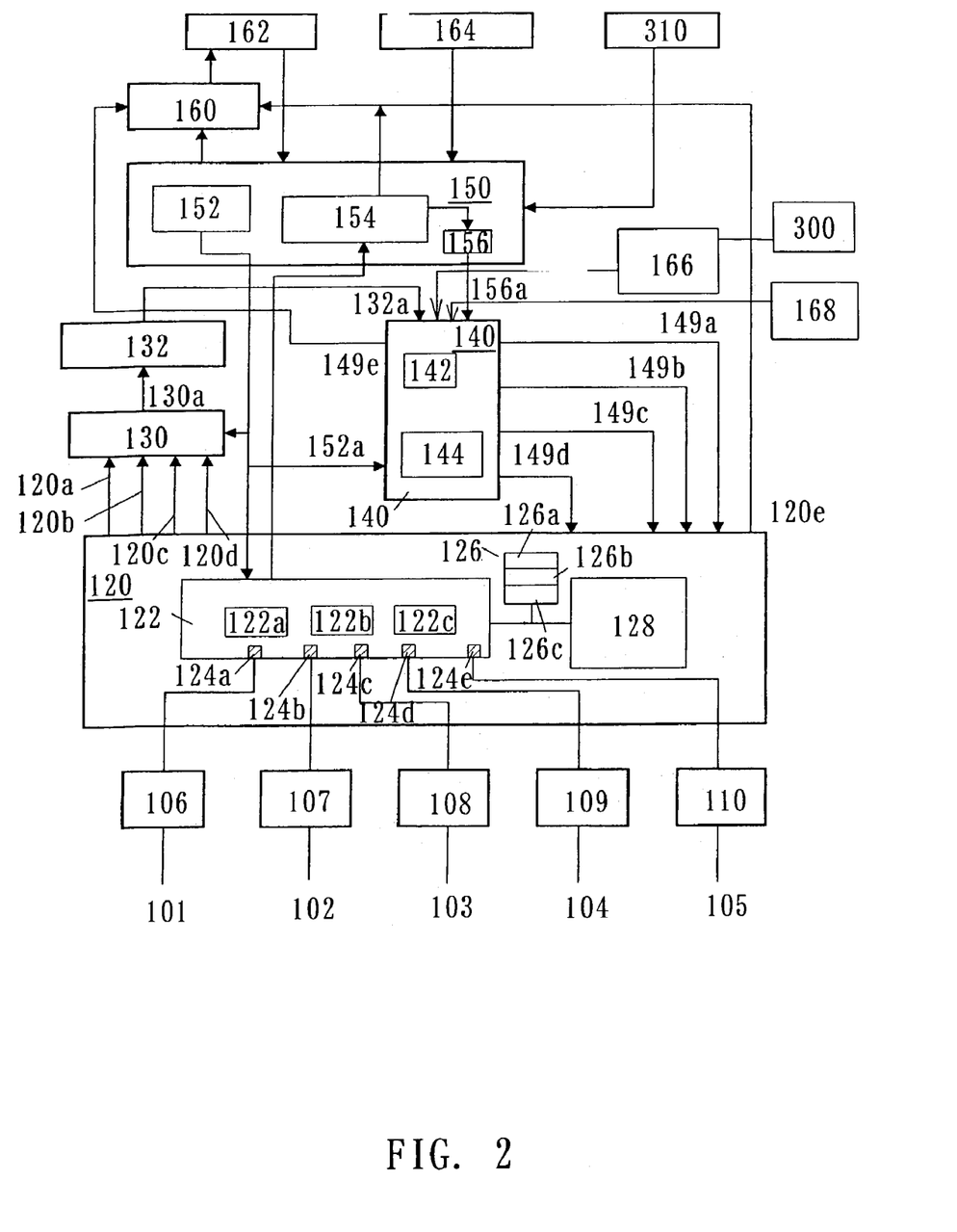
FIG. 2 is a schematic block diagram of the inventive concentrator shown in FIG. 1.

A description will now be given of a network 10 of one embodiment according to the present invention with reference to FIGS. 1 and 2. FIG. 1 is a view of an exemplary configuration of the network 10. FIG. 2 is a schematic block diagram of the concentrator 100 applied to FIG. 1.

As shown in FIG. 1, the network 10 is comprised of the Ethernet that includes the concentrator 100, network devices 210-250 connected to it (these network devices are generalized by reference to a network device 200).

The concentrator 100 is implemented as a switching hub of 100 Mbps in this embodiment. The concentrator 100 includes, as shown in FIG. 2, ports 101-105, physical layer devices ("PHYs") 106-110, a switching control circuit 120, a hardware trigger selection circuit 130, a hardware trigger register 132, a reset control circuit 140, a CPU 150, a write selection control part 160, an EEPROM 162, a flash memory 164, a power control part 166 connected to an external power supply 300, and a reset button 168.

The ports 101-105 are connected, for example, to a UTP as shown in FIG. 1. The ports 101-105 are connected to the PHYs 106-110, respectively. The ports 101-105 are connected to the network devices 210-250 through the UTPs. In this embodiment, the network devices 210, 230 and 240 are implemented as a PC, and the network devices 220 and 250 are implemented as a hub. The network device 220 is connected to PCs 212, 214 and 216, while the network device 250 is connected to PCs 252 and 254. These network devices are for exemplary purposes only, and the network device 200 may broadly cover, for example, a hub, a switch, a router, any other concentrator, a repeater, a bridge, a gateway device, a PC, and a wireless interconnecting device (e.g., an access point as a interconnecting device for wireless LAN).

100BASE-T has different encoding systems depending upon a medium (or cable) to be used, and thus includes the PHY that serves to encode. The PHYs 106-110 are PHYs for encoding, and use a Media Independent Interfaces ("MII") as an interface connected to the switching control circuit 120. The MII control parts 124a-124e are incorporated into the switching control circuit 120 in this embodiment.

More specifically, the PHYs 106-110 are those which control a physical layer in the Ethernet, provided and controlled for each port separately. Each PHY has a collision detection function and a serial/parallel conversion function. The collision detection function is one which informs a transmitted terminal of an occurrence of collision when a packet transmitted by a PHY causes a collision. The collision occurs, for example, when the network devices 210 and 100 simultaneously transmit in the half duplex. The serial/parallel conversion function is a function to convert a parallel signal transmitted from a node into a serial signal on a cable or vice versa.

The switching control circuit 120 is a section for controlling operations of a switching hub, and controls transfer processes of information (or packets) between network devices 210-250. In the transfer process control, the switching control circuit 120 reads a Media Access Control ("MAC") address of a destination terminal, and transmits a packet to a port to which the destination terminal is connected. The switching control circuit 120 includes a switching engine 122, and a MII control parts 124a-124e, a packet buffer control part 126, and a packet buffer 128.

The switching engine 122 primarily controls a transfer and an error of a packet. The switching engine 122 includes the above MII control part 124a-124e, a status register 122a, a reception counter ("RCV CNT") 122b, and a transmission counter ("XMT CNT") 122c.

The status register 122a indicates a link status and a communication active indication. The link on state means that two terminals are connected physically and logically and may communicate with each other. The link off state means that a UTP is separated from one terminal or disconnected, or the UTP cable is normal but a communication is unavailable for some reason. The communication active status (i.e., when an activate signal turns on) means that a packet is actually transmitted and received in a transmission channel.

The RCV CNT 122b counts the number of packets received at a certain port and counts up each time the port receives a packet. The XMT CNT 122c counts the number of packets transmitted at the port and counts up each time the port transmits a packet. The CPU 150 collects information of the RCV CNT 122b and XMT CNT 122c in accordance with the SNMP.

The packet buffer control part 126 includes a buffer allocation control part 126a, a buffer release control part 126b, and a buffer "full" detection part 126c. The buffer allocation control part 126a sequentially allocates a buffer for storing a packet. The buffer release control part 126b releases a used buffer so that the buffer is available for a next use. The buffer "full" detection part 126c detects an overflow capacity of the packet buffer 128 allocated to a port that receives a packet, detects a state of packet(s) beyond a permissible value, and generates a signal used for a trigger for transmitting a pause packet signal to a counterpart, as described later.

The packet buffer 128 is a memory for temporarily storing a received packet. The temporarily stored packet is then transferred to a destination that the switching engine 122 determines.

The hardware trigger selection circuit 130, which is connected to the switching control circuit 120, selectively obtains status signals 120a-120d of hardware (i.e., the switching control circuit 120, PHYs 106-110, and network devices 210-250), and transmits a hardware signal 130a to the hardware trigger register 132 when determining that its signal level meets a predetermined threshold. In this embodiment, the hardware signal includes a collision occurrence signal, a link state ("LINK") signal, a communication active indication ("ACTIVATE") signal, etc., and the console 310 may arbitrarily vary these signals. More specifically, the hardware trigger selection circuit 130 obtains a collision occurrence signal from the PHYs 106-110. The hardware trigger selection circuit 130 obtains information of LINK and ACTIVATE from the status register 122a in the switching engine 122.

The hardware trigger register 132 supplies when receiving a hardware signal from the hardware trigger selection circuit 130, a trigger 1 signal 132a to the reset control circuit 140. The trigger 1 signal 132a is one of the condition signals to start the reset operation by the reset control circuit 140.

The reset control circuit 140 controls a reset signal to be supplied to the switching control circuit 120. In other words, the reset control circuit 140 allows a reset signal to operate, which has been selected from the selective resets 149-149c and stored in the non-volatile memory 143, when the trigger 1 signal 132a and trigger 2 signal 156a occur, and to reset a corresponding region. An activation control signal 152a supplied from an instruction execution control part 152 in the CPU 150 determines whether the selective resets 149a-149c operate. The reset operations by the selective reset signals 149a-149c may reset, for example, only the specific port, MII control part or PHY(s). The power-on time reset signal 149a may reset the switching engine 122 and all the ports of PHYs 106 and 110. The reset control circuit 140 transmits a write trigger signal 149e to the write selection control part 160 when generating the reset signals 149a-149d.

The reset control circuit 140 is connected to the switching control circuit 120, hardware trigger register 132, CPU 150, power control part 166, and reset button 168. The reset control circuit 140 includes a timer 142, a non-volatile memory 143, and a sequence control part 144.

The timer 142 measures preset time or elapsed time. It is not necessary to provide the timer 142 in the reset control circuit 140. The reset control circuit 140 includes a comparator or another logic circuit (not shown) to determine whether the timer 142 reaches the predetermined time or measures the predetermined time that has passed.

The non-volatile memory 143 stores a table that correlates trigger conditions and the selective resets 149a-149c and power-on time reset signal 149a.

The sequence control part 144 may designate a hardware condition that generates a selective reset, a condition of communication status control information, and a generation timing condition. The selective reset operates when one or more of the trigger 1, trigger 2 and elapsed time conditions occur (in case of multiple conditions when they occur simultaneously or non-simultaneously).

For example, the selective reset does not operate at timing 1 when the trigger 1 signal 132a occurs, and it is stored that the trigger 1 has occurred. The selective reset then operates at timing 2 when the trigger 2 signal 156a occurs (even when the trigger 1 is turned off). In this case, the selective trigger generation condition is the generation of the trigger 1 signal 132a and the subsequent generation of the trigger 2 signal 156a after the trigger 1 condition occurs, whereby the trigger conditions are programmable by multiple different timings. The console 310 may designate this sequence control program.

The CPU 150 executes firmware instructions. The firmware may control the switching hub to regularly read various communication status control information in the switching hub in accordance with Simple Network Management Protocol ("SMTP") to control communications. The CPU 150 includes an instruction execution control part 152, a communication status control information part 154, and a selection part 156.

The instruction execution control part 152 executes firmware in the CPU 150. The instruction execution control part 152 supplies the reset control circuit 140 with an activation control signal 152a for determining whether the selective resets 149a-149c and the power-on time reset signal 149d operate. The firmware controls the activation control signal 152a based on the value preset by the console 310.

The communication status control information part 154 obtains information representative of respective update statuses of the RCV CNT 122b and XMT CNT 122c in the switching engine 122 in this embodiment. The communication status control information part 154 defines various communication status control information indicative of a status of the concentrator 100. These include, for example, the number of received packets, the number of transmitted packets, presence or absence of various errors, communication speed, full duplex/half duplex, etc. for each port. These pieces of information is temporarily set in a register (not shown) and read as communication status control information in the CPU 150 by the firmware in the CPU 150. The communication status control information part 154 monitors operational status of the switching control circuit 140 and the console 310 may arbitrarily vary a necessary object to be monitored for a reset operation.

The selection part 156 selects information predetermined by the communication status control information, and provides the reset control circuit 140 with the trigger 2 signal 156a. The trigger 2 signal 156a is one of condition signals for starting the reset operation by the reset control circuit 140.

When the selective reset operates, the write trigger signal 149a turns on and operates the write section control part 160, whereby the EEPROM 162 writes and stores necessary write information 120e from the switching control circuit 120. The write information 120e may be designated in advance. This information is stored even when the power turns off, and thus may be read out when the error is investigated.

The EEPROM 162 stores various set information designated by the console 310 and information held at the time when the selective reset condition occurs. It also stores selective trigger conditions.

The flash memory 164 stores the firmware to operate the CPU 150. When the concentrator turns on, the CPU 150 reads the firmware from the flash memory 164.

The power control part 166 supplies a reset signal at the time of power-on of the external power source 300 to the switching control circuit 120 through the reset control circuit 140, but the power-on time reset signal (not shown) is supplied to the other part (e.g., CPU 150).

The reset button 168 is used to reset the concentrator 100 manually. When the reset button 168 is pressed, the reset control circuit 140 generates a power-on time reset signal 149d.

The concentrator 100 includes a display (not shown), which includes a plurality of LEDs for visually indicating the communication states. For example, the display detects and identifies the full duplex link/half duplex link, 100BASE-TX link and 10BASE-T link, system errors, power supply errors, etc.

The external power supply 300 is connected to the power supply control part 166 and supplies power to the concentrator 100.

The console 310 is a computer, such as a PC, or a terminal attached to the computer, and sets the operational mode, operational conditions, selective trigger conditions of the concentrator 100.

A description will now be given of the operations of the concentrator 100 with reference to FIGS. 3-6. The reset control operation in this embodiment sets conditions to be reset, determines whether certain event(s) satisfy such conditions, and resets part or all of the switching control circuit when the event(s) satisfy. As a result, the concentrator 100 automatically resets and restores the circuit, and the network is restore in a relatively shorter time than the manual operation. Since the reset conditions have been restricted, a reset is prevented in case of temporal defects of the concentrator 100 which do not require the concentrator 100 to be reset, thereby preventing the repeat of a communication. In addition, a reset of part of the switching control circuit 120 may reset and quickly restore a circuit in the concentrator relating to a network device that is faulty or is likely to be faulty while maintaining communications of other network devices.

Figure 3:
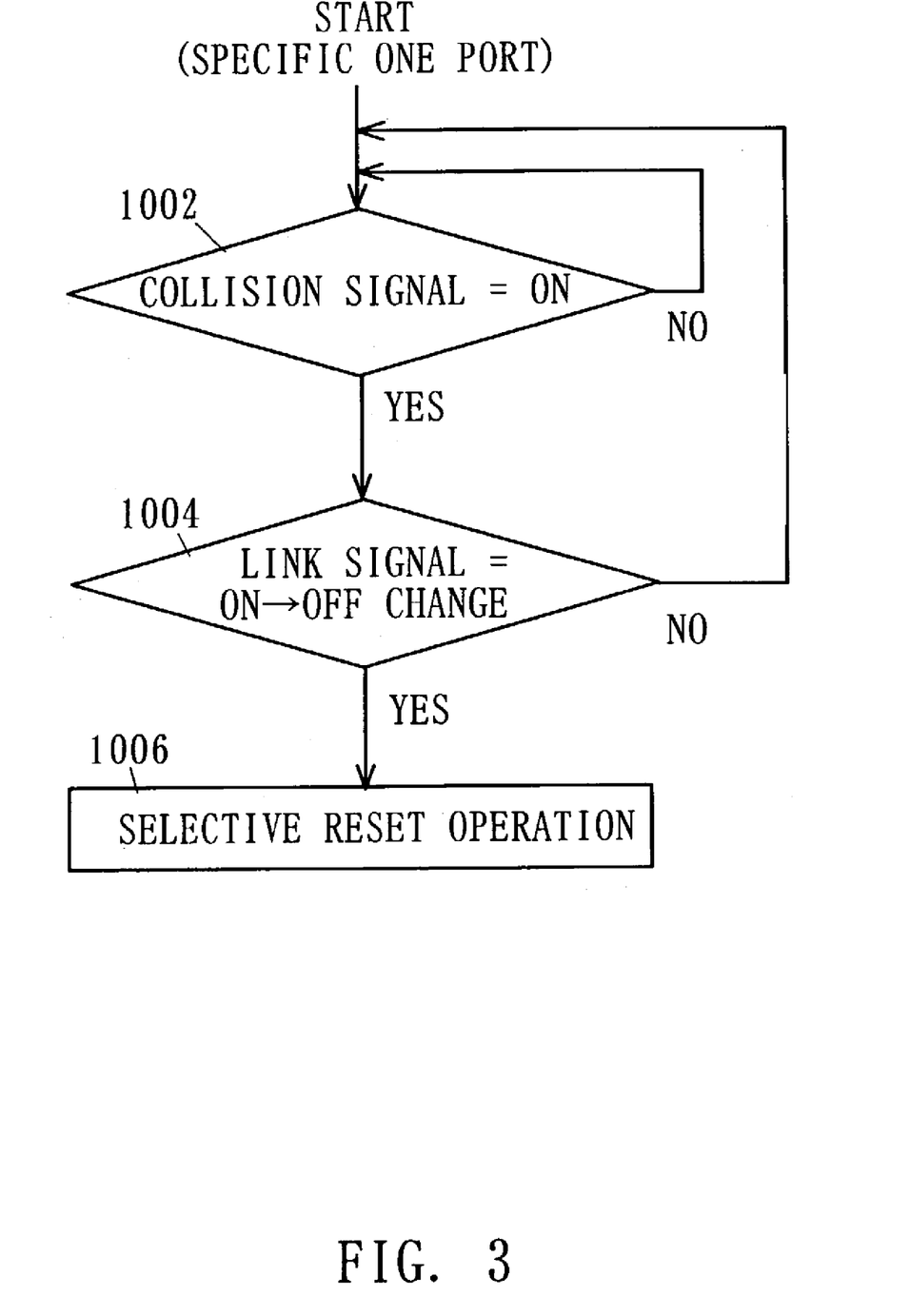
FIG. 3 is a flowchart for explaining a reset operation of a concentrator 100 of a first embodiment according to the present invention.

Referring now to FIG. 3, a description will be given of the reset operation of the reset control circuit 140 of the concentrator 100 of the first embodiment according to the present invention. In this embodiment, the reset control circuit 140 generates a selective reset signal to the port when a collision occurs and the link is off. This is based on experience of obstructions in which a concentrator often hangs up when a collision occurs and the link signal turns off, and the hang-up is eliminated when the concentrator is reset.

More specifically, the sequence control part 144 determines whether it receives the trigger 1 signal 132a, which indicates that a collision occurs (step 1002), determines whether the trigger 1 signal 132a indicates that the link signal turns off (step 1004), starts a selective reset operation only when both (steps 1002 and 1004) are YES (step 1006), and generates a selective reset signal so as to reset a circuit corresponding to the port.

As discussed, the hardware trigger register 132 generates the trigger 1 signal 132a indicating that a collision occurs when the PHYs 106-110 detect a collision. The hardware trigger selection circuit 130 obtains the detection result and informs the hardware trigger register 132 of the result. The collision occurs when two terminals attempt to communicate at the same time. The link signal turns off when the UTP is disconnected or has fallen out of the network device or the UTP works properly but the communication is unavailable for some reason. When there is nothing wrong with the UTP, the concentrator 100 is considered to be abnormal. The hardware trigger register 132 generates the trigger 1 signal 132a indicating that the link signal turns off when the status register 122a in the switching engine 122 detects that the link signal turns off, the hardware trigger selection circuit 130 obtains this detection result, and informs the hardware trigger register 132 of the detection result.

In this case, the CPU 150 supplies a control signal 152a for activating the reset signals 149a-149d. After the reset signal is generated, the reset control circuit 140 sends a write trigger signal 149e to the write selection control part 160 and the write selection control part 160 writes, in response to the write trigger signal 149e, the write information 120e from the switching control circuit 120 in the EEPROM 162.

Figure 4:
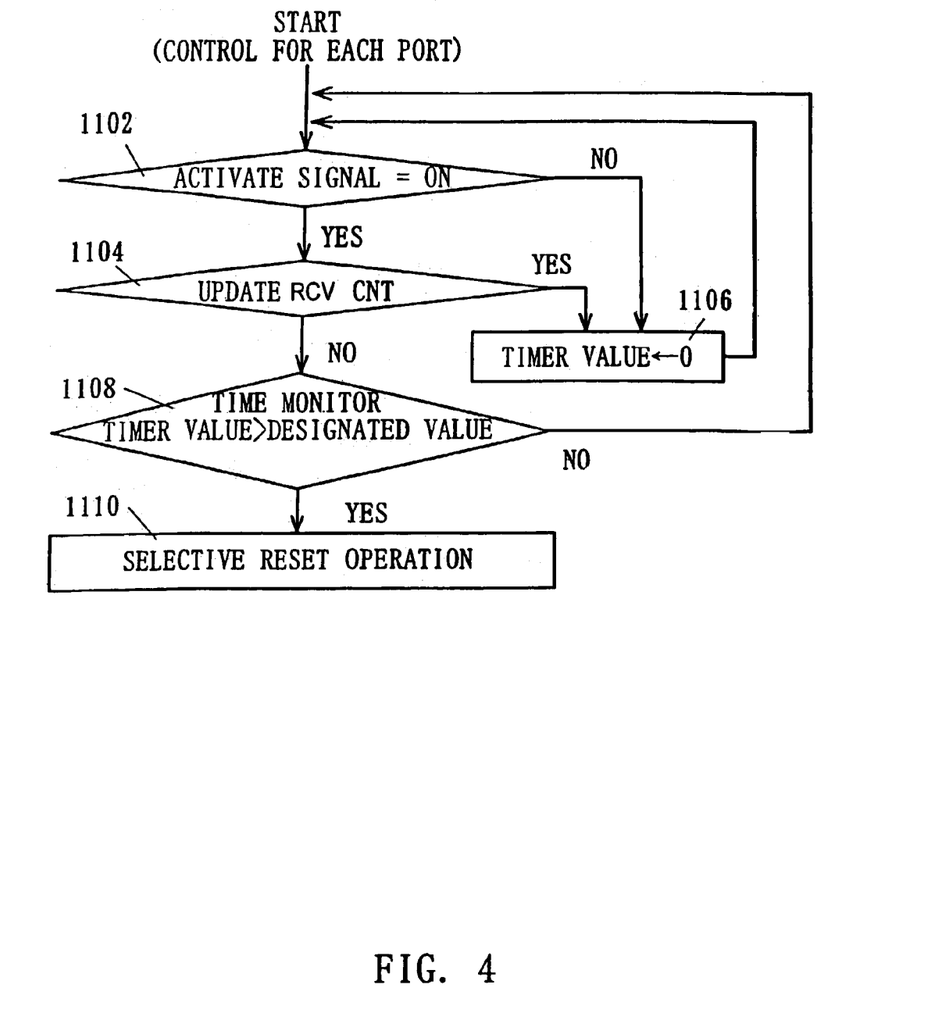
FIG. 4 is a flowchart for explaining a reset operation of a concentrator 100 of a second embodiment according to the present invention.

Referring now to FIG. 4, a description will be given of the reset operation by a reset control circuit 140 in the concentrator 100 of a second embodiment according to the present invention. In this embodiment, the reset control circuit 140 generates a selective reset signal to a port when the ACTIVATE signal turns on, the RCV CNT 122b is not updated and the timer 142 measures that predetermined period has passed. This is based on experience in which receptions have often been restored after a concentrator is reset in a case where the reception is unavailable for a long time for some reason including that the switching engine has hung up.

More specifically, the sequence control part 144 determines whether it receives the trigger 1 signal 132a indicating that the ACTIVATE signal turns on (step 1102), determines whether it receives the trigger 2 signal 156a indicating that the RCV CNT 122b has not been updated (step 1104), determines whether the timer 142 measures that a predetermined period has passed (step 1108), and starts the reset operation when all of these conditions are met (step 1110), whereby a selective reset signal is generated to reset a circuit corresponding to a port. The "predetermined period" that the timer 142 measures depends upon the network 10, and may be set through the console 310. For example, the "predetermined period" is variable in accordance with the network size, time (morning and afternoon, day and night, day in the week). The timer 142 is reset whenever the RCV CNT 122b is updated (step 1106).

As discussed, the hardware trigger register 132 generates the trigger 1 signal 132a, indicating that the ACTIVATE signal turns on, when the status register 122a in the switching engine 122 detects that the link signal turns off, the hardware trigger selection circuit 130 obtains this detection result, and informs the hardware trigger register 132 of the detection result. The ACTIVATE signal turns on when a certain port actually receives a packet.

An update status of the RCV CNT 122b is monitored by the communication status control information part 154 in the CPU 150, and generated by the selection part 156 when part 154 informs the part 156 of the monitor result. When the packet is properly received, the RCV CNT 122b is supposed to be updated. However, when there is something wrong with the concentrator 100, the non-update status continues.

In this case, the CPU 150 supplies the control signal 152a for activating the reset signals 149a-149d. After the reset signal is generated, the reset control circuit 140 sends a write trigger signal 149e to the write selection control part 160, and the write selection control part 160 writes, in response to the write trigger signal 149e, the write information 120e from the switching control circuit 120 in the EEPROM 162.

Figure 5:
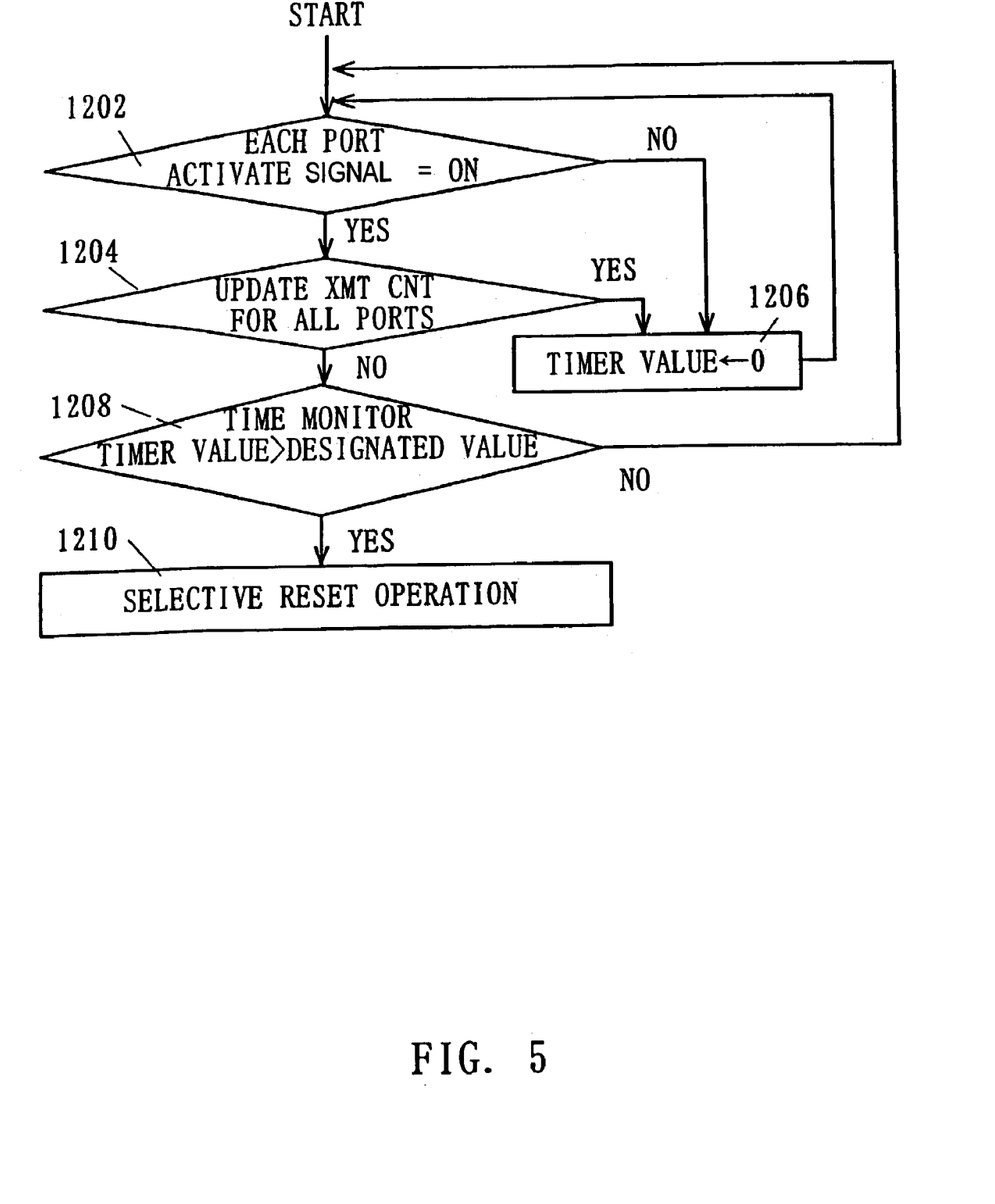
FIG. 5 is a flowchart for explaining a reset operation of a concentrator 100 of a third embodiment according to the present invention.

Referring now to FIG. 5, a description will be given of the reset operation by a reset control circuit 140 in the concentrator 100 of a third embodiment according to the present invention. In this embodiment, the reset control circuit 140 generates a selective reset signal to a port when the active signal turns on, the XMT CNT 122c is not updated and the timer 142 measures that predetermined period has passed. This is based on experience in which transmissions have often been restored after a concentrator is reset in a case where the transmission is unavailable from any port and thus the communication is unavailable.

More specifically, the sequence control part 144 determines whether it receives the trigger 1 signal 132a indicating that the ACTIVATE signal turns on (step 1202), and determines whether it receives the trigger 2 signal 156a indicating that the XMT CNT 122c has not been updated (step 1204), determines whether the timer 142 measures that a predetermined period has passed (step 1208), and starts the reset operation when all of these conditions are met (step 1210), whereby a selective reset signal is generated to reset a circuit corresponding to a port. The "predetermined period" that the timer 142 measures depends upon the network 10, and may be set through the console 310. For example, the "predetermined period" is variable in accordance with the network size, time (morning and afternoon, day and night, day in the week). The timer 142 is reset whenever the XMT CNT 122c is updated (step 1206).

As discussed, the hardware trigger register 132 generates the trigger 1 signal 132a, indicating that the ACTIVATE signal turns on, when the status register 122a in the switching engine 122 detects that the link signal turns off, the hardware trigger selection circuit 130 obtains this detection result and informs the hardware trigger register 132 of the detection result. The ACTIVATE signal turns on when a certain port actually transmits a packet.

An update status of the XMT CNT 122c is monitored by the communication status control information part 154 in the CPU 150 and generated by the selection part 156 when the part 154 informs the part 156 of the monitor result. When the packet is properly transmitted, the XMT CNT 122c is supposed to be updated. However, when there is something wrong with the concentrator 100, the non-update status continues.

In this case, the CPU 150 supplies the control signal 152a for activating the reset signals 149a-149d. After the reset signal is generated, the reset control circuit 140 sends a write trigger signal 149e to the write selection control part 160, and the write selection control part 160 writes, in response to the write trigger signal 149e, the write information 120e from the switching control circuit 120 in the EEPROM 162.

Figure 6:
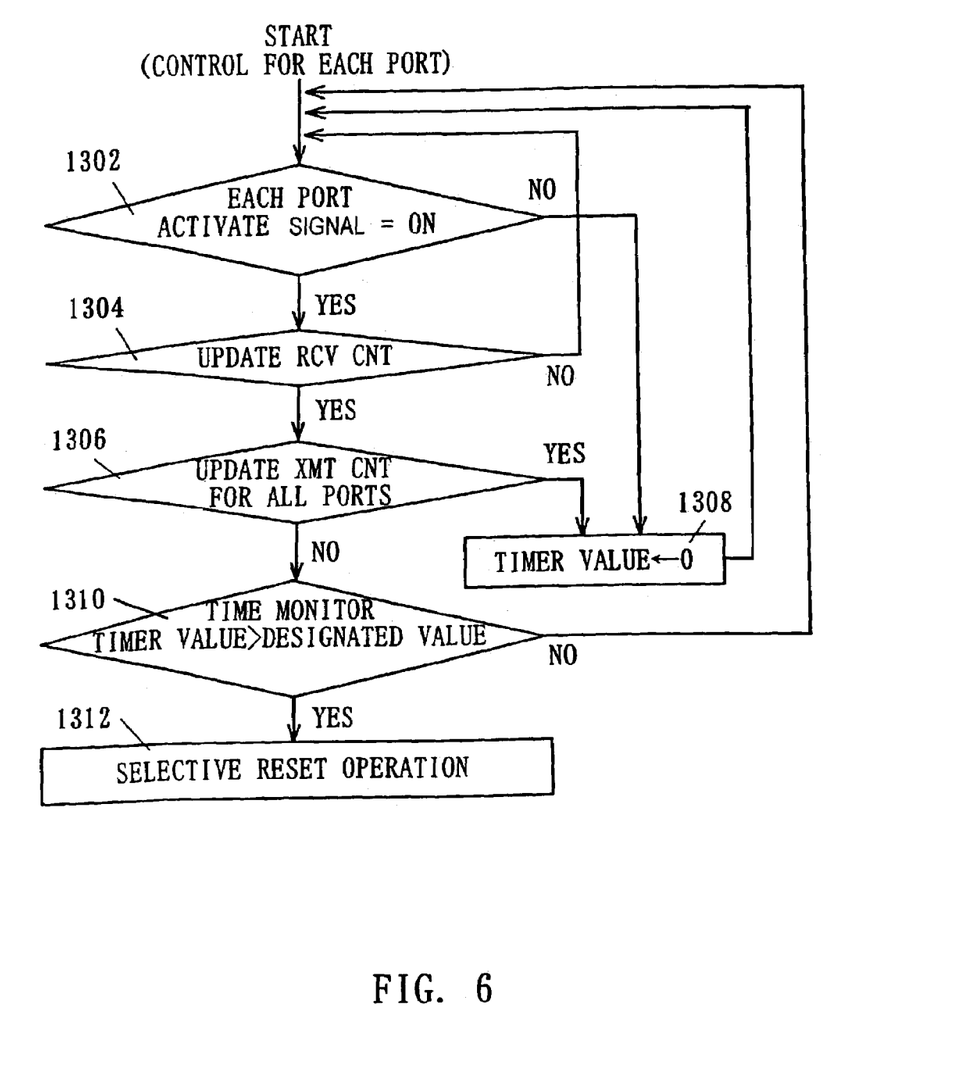
FIG. 6 is a flowchart for explaining a reset operation of a concentrator 100 of a fourth embodiment according to the present invention.

Referring now to FIG. 6, a description will be given of the reset operation by a reset control circuit 140 in the concentrator 100 of a fourth embodiment according to the present invention. In this embodiment, the reset control circuit 140 generates a selective reset signal to a port when the ACTIVATE signal turns on, the RCV CNT 122b is updated but the XMT CNTs 122c of all the ports are not updated and the timer 142 measures that predetermined period has passed. This is based on experience in which communications have often restored after a concentrator is reset in a case where a reception is available but a transmission is unavailable from any port and thus the communication is unavailable.

More specifically, the sequence control part 144 determines whether it receives the trigger 1 signal 132a indicating that the ACTIVATE signal turns on (step 1302), determines whether it receives the trigger 2 signal 156a indicating that the RCV CNT 122b has been updated (step 1304), determines whether it receives the trigger 2 signal 156a indicating that the XMT CNT 122c has not been updated (step 1306), determines whether the timer 142 measures that a predetermined period has passed (step 1310), and starts the reset operation when all of these conditions are met (step 1312), whereby a selective reset signal is generated to reset a circuit corresponding to a port. The "predetermined period" that the timer 142 measures depends upon the network 10, and may be set through the console 310. For example, the "predetermined period" is variable in accordance with the network size, time (morning and afternoon, day and night, day in the week). The timer 142 is reset whenever the XNT CNT 122c is updated (step 1308).

As discussed, the hardware trigger register 132 generates the trigger 1 signal 132a, indicating that the ACTIVATE signal turns on, when the status register 122a in the switching engine 122 detects that the link signal turns off, the hardware trigger selection circuit 130 obtains this detection result and informs the hardware trigger register 132 of the detection result. The ACTIVATE signal turns on when a certain port actually receives or transmits a packet.

An update status of the RCV CNT 122b is monitored by the communication status control information part 154 in the CPU 150 and generated by the selection part 156 when the part 154 informs the part 156 of the monitor result. An update of the RCV CNT 122b means that the packet is properly received.

An update status of the XMT CNT 122c is monitored by the communication status control information part 154 in the CPU 150 and generated by the selection part 156 when the part 154 informs the part 156 of the monitor result. In this embodiment, the communication status control information part 154 in the CPU 150 checks all the XMT CNTs 122c and confirms that there is no transmission. When the packet is properly transmitted, the transmission counter 122b is supposed to be updated. However, when there is something wrong with the concentrator 100, the non-update status continues.

In this case, the CPU 150 supplies the control signal 152a for activating the reset signals 149a-149d. After the reset signal is generated, the reset control circuit 140 sends a write trigger signal 149e to the write selection control part 160 and the write selection control part 160 writes, in response to the write trigger signal 149e, the write information 120e from the switching control circuit 120 in the EEPROM 162.

Figure 7:
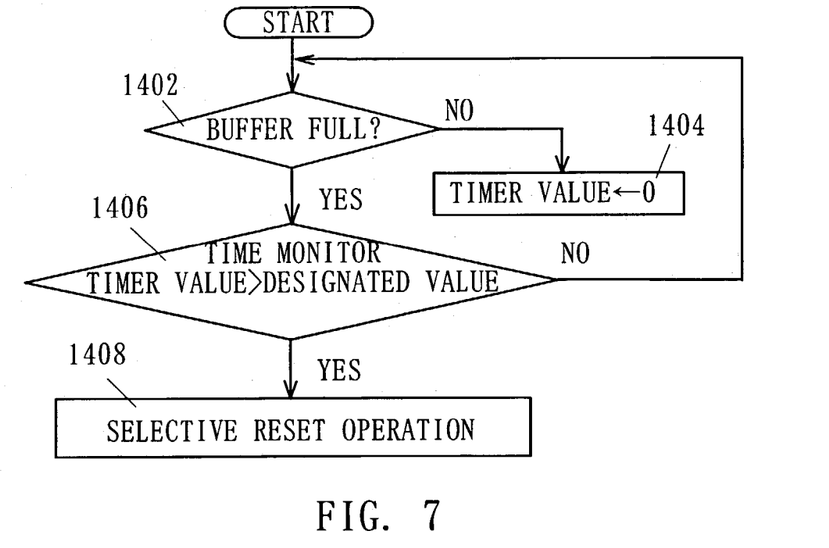
FIG. 7 is a flowchart for explaining a reset operation of a concentrator 100 of a fifth embodiment according to the present invention.

Referring now to FIG. 7, a description will be given of the reset operation by a reset control circuit 140 in the concentrator 100 of a fifth embodiment according to the present invention. In this embodiment, the reset control circuit 140 generates a selective reset signal to a port when the reception packet buffer 128 for the port is continuously in the full state for a certain period. This is based on experience in which communications have often been restored after a concentrator is reset in a case where a pause packet defined in IEEE 802.3 is continuously transmitted and thus the communication is unavailable. Here, the "pause packet" is a packet that requests a stop of transmission of a packet by a counterpart when it receives the packet beyond its process capacity from the counterpart.

More specifically, the hardware trigger register 132 generates the pause packet when the hardware trigger selection circuit 130 obtains that the reception packet buffer 128 is in the full state and informs the hardware trigger register 132 of that. This is determined based on the trigger 1 signal 132a (step 1402), and whether the timer 142 measures that a predetermined period has passed (step 1406). The reset operation starts when all of these conditions are met (step 1408). As a result, a selective reset signal is generated to reset a circuit corresponding to a port. The "predetermined period" that the timer 142 measures depends upon the network 10, and may be set through the console 310. For example, the "predetermined period" is variable in accordance with the network size, time (morning and afternoon, day and night, day in the week). The timer 142 is reset whenever the full state of the reception packet buffer is not detected (step 1404).

As discussed, the communication control information part 156 in the CPU 150 whether the buffer "full" detecting part 126c in the packet buffer control part 126 detects that the reception packet buffer 128 is full or the pause packet signal is transmitted in response to this, and informs the selection part 156 of the monitoring result so that the selection part 156 generates it. When the predetermined period has passed, the network device at the reception side is supposed to release the pause packet signal, but the reception packet buffer in the full state continues when there is something wrong with the concentrator 100.

In this case, the CPU 150 supplies the control signal 152a for activating the reset signals 149a-149d. After the reset signal is generated, the reset control circuit 140 sends a write trigger signal 149e to the write selection control part 160 and the write selection control part 160 writes, in response to the write trigger signal 149e, the write information 120e from the switching control circuit 120 in the EEPROM 162.

Figure 8:
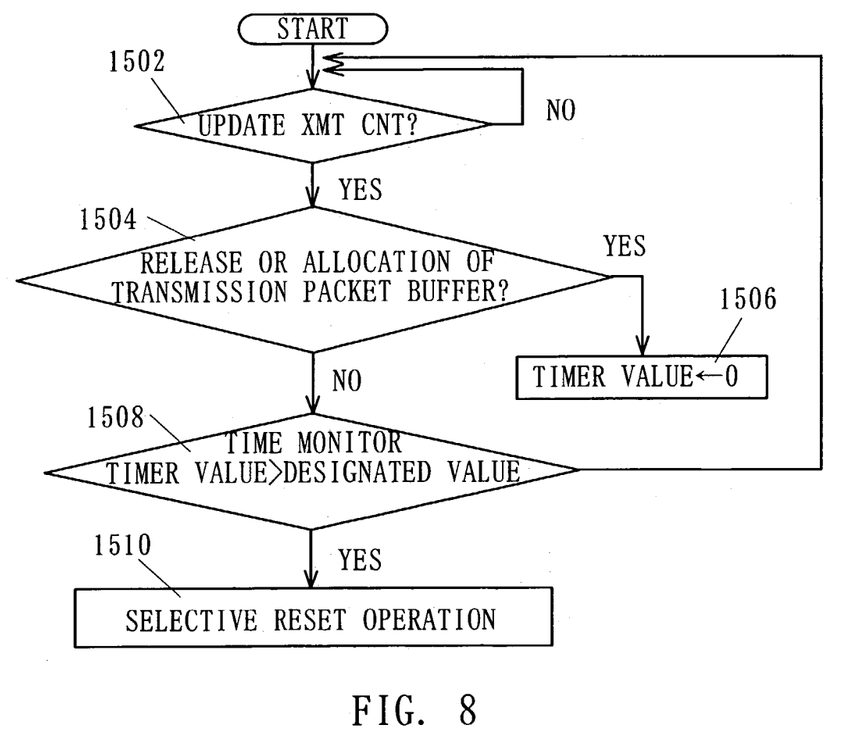
FIG. 8 is a flowchart for explaining a reset operation of a concentrator 100 of a sixth embodiment according to the present invention.

Referring now to FIG. 8, a description will be given of a reset operation by a reset control circuit 140 in the concentrator 100 of a sixth embodiment according to the present invention. This embodiment generates a selective reset signal to a port where a transmission of an abnormal packet (for example, an erroneous packet such as a Cyclic Redundancy Check ("CRC") error) continues for a certain period. This is based on experience in which abnormal communications have been eliminated after a concentrator is reset in a case where the XMT CNT 122c is updated but a release or allocation of the packet buffer 128 relating to the transmission has not been conducted for a certain time and thus the communication becomes abnormal.

The CRC is a check system for detecting a bit error that occurs in the data transmission. It processes binary data as a data transmission block of an object to be checked by using an equation called a generation polynomial, produces check data of a certain number of bits, and appends it to actual data and sends it (as a result, the data has a format, for example, of a preamble, header, data, and CRC arranged in this order). The reception side detects the existence of a bit error by processing the check data with the actual data using the same generation polynomial as that of the transmission side. It is abnormal that a transmitting network device sends a packet with a CRC error.

More specifically, the sequence control part 144 in this embodiment determines whether it receives the trigger 2 signal 156a indicating that the XMT CNT 122c has been updated (step 1502), determines whether it receives the trigger 2 signal 156a indicating that the transmission packet buffer 128 has not been released or allocated (step 1504), and then determines whether the timer 142 measures that a certain period has passed (step 1508). It starts a selective reset action when all of these conditions are met (step 1510), and generates a selective reset signal to reset a circuit corresponding to the port. The "predetermined period" that the timer 142 measures depends upon the network 10, and may be set through the console 310. For example, the "predetermined period" is variable in accordance with the network size, time (morning and afternoon, day and night, day in the week). The timer 142 is reset whenever a release or allocation of the transmission packet buffer 128 is detected (step 1506).

The selection part 156 generates an update status of the XMT CNT 122c by the communication status control information part 154 in the CPU 150 monitors that and informs the selection part 156 of the monitor result. An update of the XMT CNT 122c means that the packet is properly transmitted.

The selection part 156 generates an allocation or release of the transmission packet buffer 128 when the buffer allocation control part 126a or buffer release control part 126b in the packet buffer control part 126 detects it and the communication state control information part 154 in the CPU 150 monitors and informs the selection part 156 of this. When a certain period has passed, the network device at the transmission side is supposed to release or allocate the buffer 128, but a transmission of the abnormal packet (for example, the above CRC error packet) continues when there is something wrong with the concentrator 100.

In this case, the CPU 150 supplies the control signal 152a for activating the reset signals 149a-149d. After the reset signal is generated, the reset control circuit 140 sends a write trigger signal 149e to the write selection control part 160 and the write selection control part 160 writes, in response to the write trigger signal 149e, the write information 120e from the switching control circuit 120 in the EEPROM 162.

Further, the present invention is not limited to these preferred embodiments, and various variations and modifications may be made without departing from the scope of the present invention.

INDUSTRIAL APPLICABILITY

The inventive concentrator and its reset control method automatically resets the concentrator and limits the reset conditions to necessary cases, thus easily and reliably securing early restorations of the network communications from obstructions.

What is claimed is:

1. A method for controlling resetting of a concentrator to which a plurality of network device are connectible, said method comprising the steps of:
   determining whether at least one of a communication control part and a timer has generated a signal that satisfies a predetermined reset condition, the communication control part controlling a transfer process of information among the network devices; and
   generating a signal for resetting the communication control part when said determining step determines the reset condition has been satisfied,
   wherein the reset condition includes an occurrence of a collision between the network devices, and a change of a link on state indicative of a communication availability between the concentrator and the network device into an off state.

2. A method for controlling resetting of a concentrator to which a plurality of network device are connectible, said method comprising the steps of:
   determining whether at least one of a communication control part and a timer has generated a signal that satisfies a predetermined reset condition, the communication control part controlling a transfer process of information among the network devices; and
   generating a signal for resetting the communication control part when said determining step determines the reset condition has been satisfied,
   wherein the reset condition includes a start of a communication active state indicating that a packet is being received through one pod connected to the network device, and a lack of update of a number of packets received at the port within a certain period.

3. A method for controlling resetting of a concentrator to which a plurality of network device are connectible, said method comprising the steps of:
   determining whether at least one of a communication control part and a timer has generated a signal that satisfies a predetermined reset condition, the communication control part controlling a transfer process of information among the network devices; and
   generating a signal for resetting the communication control part when said determining step determines the reset condition has been satisfied.
   wherein the reset condition includes a start of a communication active state indicating that a packet is being transmitted through one port connected to the network device, and a lack of update of a number of packets transmitted at the port within a certain period.

4. A method for controlling resetting of a concentrator to which a plurality of network device are connectible, said method comprising the steps of:
   determining whether at least one of a communication control part and a timer has generated a signal that satisfies a predetermined reset condition, the communication control part controlling a transfer process of information among the network devices; and
   generating a signal for resetting the communication control part when said determining step determines the reset condition has been satisfied,
   wherein the reset condition includes a start of a communication active state indicating that a packet is being transmitted through one port connected to the network device, an update of a number of packets received at the port within a certain period, and a lack of update of the number of packets transmitted at the port within a certain period.

5. A method for controlling resetting of a concentrator to which a plurality of network device are connectible, said method comprising the steps of:
   determining whether at least one of a communication control part and a timer has generated a signal that satisfies a predetermined reset condition, the communication control part controlling a transfer process of information among the network devices; and
   generating a signal for resetting the communication control part when said determining step determines the reset condition has been satisfied,
   wherein the reset condition includes a transmission of a pause packet signal longer than a prescribed period from one port connected to the network device, the pause packet signal requesting a stop of sending the packet.

6. A method for controlling resetting of a concentrator to which a plurality of network device are connectible, said method comprising the steps of:
   determining whether at least one of a communication control part and a timer has generated a signal that satisfies a predetermined reset condition, the communication control part controlling a transfer process of information among the network devices; and
   generating a signal for resetting the communication control part when said determining step determines the reset condition has been satisfied,
   wherein the reset condition includes an update of a number of packets within a certain period received at one port connected to the network device, and a lack of release or allocation of a buffer for temporarily storing the packet, within a certain period.

7. A concentrator for use with a local area network, the concentrator including a plurality of ports, and serving to monitor a communication status, the concentrator comprising:
specific reset activating means for activating a specific reset function different from a reset at the time of power-on, and for determining whether the specific reset function activates when a specific trigger condition is met;
means for designating and varying one or more various specific trigger conditions; and
a non-volatile memory for storing a designated status of a controller when the specific reset function activates, wherein the non-volatile memory maintains memory contents during an action of the specific reset function and the reset at the time of power-on, providing the concentrator with an automatic restoration function at the time of obstructions.

8. A concentrator according to claim 7, wherein the specific trigger condition is programmable to designate one of the following conditions: an occurrence of one event; simultaneous occurrences of multiple events at the same time; an occurrence of one event at multiple times; and simultaneous occurrences of multiple events at multiple times, wherein an event or simultaneous events occurring at each of the multiple times can be the same event or different events at each time, and wherein a condition between each time-sequential event or group of events can be designated.

9. A concentrator according to claim 8, wherein the specific reset function designates simultaneously resetting all of communication functions in the concentrator or resetting part of a communication control function in the concentrator, the resetting being conducted in accordance with setting of the specific trigger conditions.

10. A concentrator according to claim 9, wherein the specific trigger condition designates control error types and a continuous occurrence of a control error for a designated period beyond a prescribed time, the specific reset function being activated when the control error occurs over the designated period.

11. A concentrator according to claim 8, wherein the specific reset function resets a communication control function relating to one or more communication ports for which the specific trigger condition occurs.

12. A concentrator according to claim 11, wherein the specific trigger condition designates control error types and a continuous occurrence of a control error for a designated period beyond a prescribed time, the specific reset function being activated when the control error occurs over the designated period.

13. A concentrator according to claim 8, wherein setting of the specific trigger condition resets a reception port or a transmission port or simultaneously resets all of communication functions in the concentrator when a port does not perform a receiving action or a transmitting action longer than a designated prescribed time as based on monitoring the communication status.

14. A concentrator according to claim 7, wherein the specific reset function designates simultaneously resetting all of communication functions in the concentrator or resetting part of a communication control function in the concentrator, the resetting being conducted in accordance with setting of the specific trigger conditions.

15. A concentrator according to claim 14, wherein the specific trigger condition designates control error types and a continuous occurrence of a control error for a designated period beyond a prescribed time, the specific reset function being activated when the control error occurs over the designated period.

16. A concentrator according to claim 7, wherein the specific reset function resets a communication control function relating to one or more communication ports for which the specific trigger condition occurs.

17. A concentrator according to claim 16, wherein the specific trigger condition designates control error types and a continuous occurrence of a control error for a designated period beyond a prescribed time, the specific reset function being activated when the control error occurs over the designated period.

18. A concentrator according to claim 7, wherein setting of the specific trigger condition resets a reception port or a transmission port or simultaneously resets all of communication functions in the concentrator when a port does not perform a receiving action or a transmitting action longer than a designated prescribed time as based on monitoring the communication status.

* * * * *